US009441073B2

(12) United States Patent
Chung et al.

(10) Patent No.: US 9,441,073 B2
(45) Date of Patent: *Sep. 13, 2016

(54) DRAWN POLYETHYLENE TEREPHTHALATE FIBER, PET TIRE CORD, AND TIRE COMPRISING THEREOF

(71) Applicant: KOLON INDUSTRIES, INC., Kwacheon, Kyungki-do (KR)

(72) Inventors: Il Chung, Gumi-si (KR); Ok-Hwa Jeon, Gyeongsan-si (KR); Gi-Woong Kim, Daegu (KR)

(73) Assignee: KOLON INDUSTRIES, INC., Kwacheon (KR)

( * ) Notice: Subject to any disclaimer, the term of this patent is extended or adjusted under 35 U.S.C. 154(b) by 350 days.

This patent is subject to a terminal disclaimer.

(21) Appl. No.: 14/078,047

(22) Filed: Nov. 12, 2013

(65) Prior Publication Data

US 2014/0299246 A1    Oct. 9, 2014

Related U.S. Application Data

(62) Division of application No. 12/935,509, filed as application No. PCT/KR2009/001647 on Mar. 31, 2009, now Pat. No. 9,045,589.

(60) Provisional application No. 61/083,912, filed on Jul. 26, 2008, provisional application No. 61/047,550, filed on Apr. 24, 2008, provisional application No. 61/047,542, filed on Apr. 24, 2008.

(30) Foreign Application Priority Data

| Mar. 31, 2008 | (KR) | 10-2008-0029560 |
| Mar. 31, 2008 | (KR) | 10-2008-0029561 |
| Jul. 22, 2008 | (KR) | 10-2008-0071073 |
| Mar. 31, 2009 | (KR) | 10-2009-0027234 |
| Mar. 31, 2009 | (KR) | 10-2009-0027235 |
| Mar. 31, 2009 | (KR) | 10-2009-0027236 |

(51) Int. Cl.
*C08G 63/183* (2006.01)
*B60C 9/00* (2006.01)
(Continued)

(52) U.S. Cl.
CPC .......... *C08G 63/183* (2013.01); *B60C 9/0042* (2013.04); *D01D 10/02* (2013.01); *D01F 6/62* (2013.01); *D02G 3/48* (2013.01); *B60C 2009/0085* (2013.04); *D10B 2331/04* (2013.01)

(58) Field of Classification Search
CPC ....... B60C 9/0042; D01D 5/098; D01F 6/62; D02G 3/48; D10B 2331/04
See application file for complete search history.

(56) References Cited

U.S. PATENT DOCUMENTS

| 3,946,100 A | 3/1976 | Davis et al. |
| 4,101,525 A | 7/1978 | Davis et al. |

(Continued)

FOREIGN PATENT DOCUMENTS

| CN | 1417391 A | 5/2003 |
| EP | 0 175 587 A2 | 3/1986 |

(Continued)

OTHER PUBLICATIONS

United States Patent and Trademark Office, Communication dated Aug. 6, 2014, issued in U.S. Appl. No. 12/935,509.

(Continued)

*Primary Examiner* — Jeremy R Pierce
(74) *Attorney, Agent, or Firm* — Sughrue Mion, PLLC (57) ABSTRACT

The present invention relates to a drawn PET fiber that can provide a cap ply cord and the like showing more improved modulus and good dimensional stability, a PET tire cord, and a tire including the same. The drawn PET fiber may be a fiber including 90 mol % or more of PET, of which the crystallinity is 53% or more, the amorphous orientation factor (AOF) is 0.15 or less, and the birefringence index is 0.14 to 0.16, after heat-treating the same at 230° C. for 1 minute under the initial load of 20 g/1000 d.

9 Claims, 1 Drawing Sheet

(51) Int. Cl.
*D01D 10/02* (2006.01)
*D01F 6/62* (2006.01)
*D02G 3/48* (2006.01)

(56) References Cited

U.S. PATENT DOCUMENTS

| | | | |
|---|---|---|---|
| 4,496,505 A | 1/1985 | Tanji et al. | |
| 5,049,447 A | 9/1991 | Shindo et al. | |
| 5,234,764 A | 8/1993 | Nelson et al. | |
| 5,558,935 A | 9/1996 | Tanaka et al. | |
| 5,891,567 A | 4/1999 | Kim et al. | |
| 5,894,875 A | 4/1999 | Masaki et al. | |
| 6,511,747 B1 | 1/2003 | Cho et al. | |
| 6,764,623 B2 | 7/2004 | Kim et al. | |
| 9,005,752 B2* | 4/2015 | Jeon | B60C 9/0042 264/210.8 |
| 9,005,754 B2* | 4/2015 | Chung | D01D 5/098 264/210.8 |
| 9,045,589 B2* | 6/2015 | Chung | B60C 9/0042 |
| 9,062,394 B2* | 6/2015 | Jeon | D01F 6/62 |
| 2001/0039988 A1 | 11/2001 | Kim et al. | |
| 2005/0196611 A1 | 9/2005 | Park et al. | |

FOREIGN PATENT DOCUMENTS

| | | |
|---|---|---|
| KR | 10-1986-0000205 B1 | 3/1986 |
| KR | 10-1995-0007813 B1 | 7/1995 |
| KR | 10-0142680 B1 | 4/1998 |
| KR | 1998-046020 A | 9/1998 |
| KR | 1998-046595 A | 9/1998 |
| KR | 1998-066987 A | 10/1998 |
| KR | 10-2005-0020885 A | 3/2005 |
| KR | 10-0660488 B1 | 12/2006 |
| KR | 10-2008-0112160 A | 12/2008 |
| KR | 10-0987494 B1 | 10/2010 |
| WO | 97/24478 A1 | 7/1997 |
| WO | 2008/156333 A1 | 12/2008 |
| WO | 2008/156334 A1 | 12/2008 |

OTHER PUBLICATIONS

Cho, et al., "Formation of micro-crystals in poly(ethylene terephthalate) fiber by a short heat treatment and their influence on the mechanical properties," European Polymer Journal, 2007, pp. 3562-3572, vol. 43.

Korean Patent Office, Korean Notice of Allowance issued in corresponding Korean Patent Application No. 10-2009-0027236, dated Jan. 24, 2013.

Korean Patent Office, Korean Notice of Allowance issued in corresponding Korean Patent Application No. 10-2009-0027234, dated Jan. 24, 2013.

* cited by examiner

DRAWN POLYETHYLENE TEREPHTHALATE FIBER, PET TIRE CORD, AND TIRE COMPRISING THEREOF

CROSS REFERENCE TO RELATED APPLICATIONS

This application is divisional of U.S. patent application Ser. No. 12/935,509, filed on Sep. 29, 2010, which is a National Stage of International Application No. PCT/KR2009/001647, filed on Mar. 31, 2009, which claims priority from the following:

Korean Patent Application No. 10-2008-0029560, filed on Mar. 31, 2008;

Korean Patent Application No. 10-2008-0029561, filed on Mar. 31, 2008;

U.S. Patent Application No. 61/047,542, filed on Apr. 24, 2008;

U.S. Patent Application No. 61/047,550 filed, on Apr. 24, 2008;

Korean Patent Application No. 10-2008-0071073, filed on Jul. 22, 2008;

U.S. Patent Application No. 61/083,912, filed on Jul. 26, 2008;

Korean Patent Application No. 10-2009-0027234, filed on Mar. 31, 2009;

Korean Patent Application No. 10-2009-0027235, filed on Mar. 31, 2009; and

Korean Patent Application No. 10-2009-0027236, filed on Mar. 31, 2009, the contents of all of which are incorporated herein by reference in their entirety.

BACKGROUND OF THE INVENTION (a) Field of the Invention

The present invention relates to a drawn polyethylene terephthalate (PET) fiber, a PET tire cord, and a tire including the same. More particularly, the present invention relates to a drawn PET fiber that can provide a cap ply cord and the like showing more improved modulus and good dimensional stability according to this, and a PET tire cord, a method of preparing the same, and a tire including the same.

(b) Description of the Related Art

Figure 1:
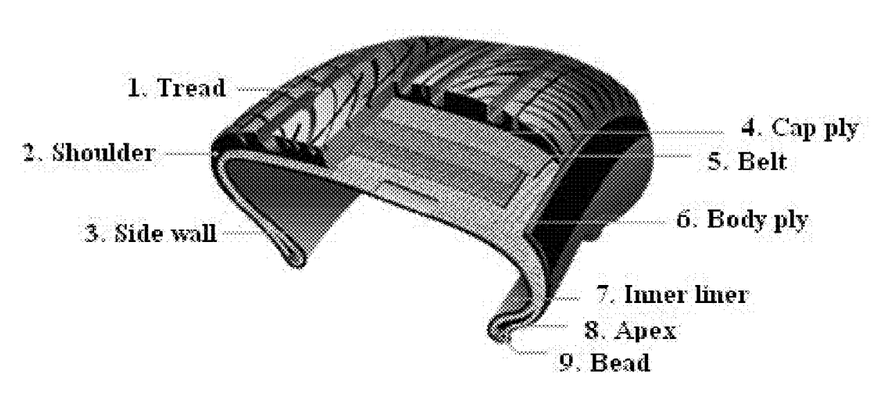
FIG. 1 is a partial cut-away perspective view illustrating a structure of a general tire.

A tire is a complex body of fiber/steel/rubber, and generally has a structure as illustrated in FIG. 1. That is, the steel and fiber cords take a role of reinforcing the rubber and form a basic skeletal structure in the tire. It is, so to speak, like the role of a bone in a human body.

As a reinforcement of the tire, the performances such as fatigue resistance, shear strength, durability, repelling elasticity, adhesion to a rubber, and the like are required to the cord. Therefore, various cords made of suitable materials are used according to the performances required to the tire.

Recently, rayon, nylon, polyester, steel, aramid, and the like are generally used as the materials for the cord, and the rayon and the polyester are used for a body ply (or a carcass) (6 in FIG. 1), the nylon is mainly used for a cap ply (4 in FIG. 1), and the steel and the aramid are mainly used for a tire-belt part (5 in FIG. 1).

The structure and the characteristics of the tire represented in FIG. 1 are briefly described hereinafter.

Tread 1: A part contacting to the road surface; this part must provide a friction force necessary for braking and driving, be good in abrasion resistance, and also be able to stand against an external shock, and its heat generation must be small.

Body ply (or Carcass) 6: A cord layer inside the tire; this part must support a load and stand against a shock, and its fatigue resistance against bending and stretching movement during a driving must be good.

Belt 5: This part is located between the body plies and mostly composed of steel wire, and it lessens the external shock and also makes the ground contacting surface of the tread wide and the driving stability good.

Side wall 3: A rubber layer between the lower part of the shoulder 2 and the bead 9; it takes a role of protecting the internal body ply 6.

Bead 9: A square or hexagonal wire bundle, wherein a rubber is coated on the steel wires; it takes a role of fitting and fixing the tire to a rim.

Inner liner 7: A part located inside the tire instead of a tube; it makes a pneumatic tire possible by preventing air leakage.

Cap ply 4: A special cord fabric located on the belt of a radial tire for some passenger cars; it minimizes the movement of the belt during driving.

Apex 8: A triangular rubber packing material used for minimizing the dispersion of the bead, protecting the bead by relieving the external shock, and preventing an air inflow during shaping.

Recently, developments for tires suitable for high speed driving are required as the passenger cars gentrify, and accordingly the stability during high speed driving and high durability of the tire are recognized as greatly important characteristics. Furthermore, the performance of the materials for the cap ply cord importantly comes to the force before everything else for satisfying the characteristics.

The steel belt inside the tire is generally arranged in the oblique direction, the steel belt, however, tends to move toward the circumferential direction during high speed driving, and there are some problems that the sharp ends of the steel belt may cause separation between the layers of the belt and shape deformation of the tire by cutting the rubber or generating cracks. The cap ply prevents the separation between the layers and the deformation of the shape of the tire and takes a role of improving the high speed durability and the driving stability by restraining the movement of the steel belt.

A nylon 66 cord is mainly used for general cap ply cord. The nylon 66 cord can show the effect of restraining the movement of steel belt by generating high shrinkage force at the circumstance of high temperature corresponding to the internal circumstance of the tire during high speed driving, and wrapping the belt. However, it has disadvantages in that the nylon 66 cord may be deformed partially by the load of the tire and the car because it has low modulus and glass-transition temperature at high temperature and low dimensional stability according to this and it may clatter during driving due to the same.

To resolve the disadvantages, a PET cord having relatively high modulus and dimensional stability have been used as the cap ply cord, however, it is difficult to restrain the movement of the steel belt effectively because of its low shrinkage force, and it is also difficult to be applied to the cap ply cord. In addition, the shape of the PET cord may easily be deformed and the deformed PET cord results in a tire deformation when the load given to the cord is changed by the change of the driving speed of the car, because the cord composed of the general PET fiber does not have sufficient dimensional stability as well.

Furthermore, in case of the cord composed of high modulus low shrinkage (HMLS) PET fiber that is widely used as a fiber or an industrial fiber, it is possible to show high shrinkage force in comparison with the cord composed of the general PET fiber, however, the disadvantages like in the nylon 66 cord described above may still be occurred because the dimensional stability decreases as the modulus is decreased in this case.

SUMMARY OF THE INVENTION

An aspect of the present invention is to provide a drawn PET fiber that can provide a cap ply cord and the like showing more improved modulus and good dimensional stability.

Another aspect of the present invention is to provide a PET tire cord that shows superior dimensional stability and is preferably applicable to the cap ply cord and the like.

Still another aspect of the present invention is to provide a tire including the PET tire cord.

The present invention provides a drawn PET fiber including 90 mol % or more of PET, of which the crystallinity is 53% or more, the amorphous orientation factor (AOF) is 0.15 or less, and the birefringence index is 0.14 to 0.16, after heat-treating the same at 230° C. for 1 minute under the initial load of 20 g/1000 d.

The present invention also provides a drawn PET fiber including 90 mol % or more of PET, and showing the elongation of 5.0 to 7.0% when giving the load of 2.0 kg/1000 d and the elongation of 11.0 to 14.0% when giving the load of 4.5 kg/1000 d, after heat-treating the same at 180° C. for 2 minute under the initial load of 20 g/1000 d.

The present invention also provides a PET tire cord including the drawn PET fiber.

The present invention also provides a PET tire cord, showing the elongation of 0.5 to 2.0% when giving the load of 2.0 kg/2000 d, and the elongation of 3.0 to 6.0% when giving the load of 4.5 kg/2000 d, after heat-treating the same at 180° C. for 2 minute under the load of 0.01 g/d.

The present invention also provides a pneumatic tire including the PET tire cord.

DETAILED DESCRIPTION OF THE PREFERRED EMBODIMENTS

Hereinafter, the drawn PET fiber, the PET tire cord, and the tire including the same are explained in more detail according to the specific embodiments of the invention. However, since the embodiments are provided as examples of the invention, the scope of the invention is not limited to or by them and it is obvious to a person skilled in the related art that various modifications of the embodiments are possible within the scope of the invention.

In addition, the term 'include' or 'comprise' means that include any component (or any element) without particular limitations and it cannot be interpreted as it excludes the addition of the other components (or elements), unless otherwise mentioned in the present entire disclosure.

The drawn PET fiber is prepared by melt-spinning a PET polymer so as to prepare an undrawn fiber, and drawing the undrawn fiber, and the PET tire cord of a dip cord type may be prepared by twisting the drawn PET fiber and dipping the same into an adhesive.

Therefore, the properties of the undrawn fiber prepared by melt-spinning the PET and the drawn fiber prepared by drawing the same are directly or indirectly reflected to the properties of the tire cord. Therefore, it becomes possible to provide a PET tire cord having superior properties by providing the drawn PET fiber having specific characteristics.

According to one embodiment of the invention, the drawn PET fiber having specific characteristics is provided. Such drawn PET fiber is a drawn PET fiber including 90 mol % or more of PET, of which the crystallinity is 53% or more, the amorphous orientation factor (AOF) is 0.15 or less, and the birefringence index is 0.14 to 0.16, after heat-treating the same at 230° C. for 1 minute under the initial load of 20 g/1000 d.

Various additives may be added to the PET polymer composing the undrawn fiber in the step of preparing the same, and it is preferable that the undrawn fiber includes 90 mol % or more of PET polymer in order to show the properties of PET suitable for the tire cord. Hereinafter, therefore, the term "PET" means what includes 90 mol % or more of PET polymer unless otherwise explained.

The drawn PET fiber according to one embodiment of the invention is prepared from the specific undrawn PET fiber under a certain process conditions described below, and it becomes to show high crystallinity of 53% or more and low AOF of 0.15 or less after the heat-treatment.

The PET polymer composing the drawn PET fiber, basically, has partially crystallized structure, and is composed of crystalline regions and amorphous regions. In particular, the drawn PET fiber according to one embodiment of the invention has much higher crystallinity than that of formerly known drawn PET fibers because of the oriented crystallization phenomenon during the preparing process, and it shows high crystallinity of 53% or more, and preferably of 53 to 60% after heat-treating the same at 230° C. for 1 minute under the initial load of 20 g/1000 d. Therefore, it is revealed that the drawn PET fiber and the tire cord prepared therefrom can show high shrinkage force and modulus due to such high crystallinity.

At the same time, the drawn PET fiber shows the AOF of 0.15 or less, and preferably 0.01 to 0.10, which is much lower than that of formerly known drawn PET fibers, after heat-treating the same under the conditions described above. The AOF means that the degree of orientation of the chains included in the amorphous region, and it has low value as the entanglement of the chains of the amorphous region increases. Generally, the drawn fiber having the low AOF and the tire cord prepared therefrom show low shrinkage force and low shrinkage rate, because the degree of disorder increases as the AOF decreases and the chains of the amorphous region becomes not a strained structure but a relaxed structure. However, the drawn PET fiber according to one embodiment of the invention includes more cross-linking bonds per a unit volume, because the molecular chains constituting the drawn PET fiber slip during the spinning process and form a fine network structure. On this account, the drawn PET fiber may become the structure of which the chains in the amorphous region are strained in spite of the largely lower AOF value, and thus it shows developed crystalline structure and superior orientation characteristics due to this.

Therefore, the drawn PET fiber according to one embodiment of the invention can show low shrinkage rate and excellent modulus while showing superior shrinkage force because of its developed crystalline structure and superior orientation characteristics. Therefore, the tire cord prepared from the drawn PET fiber also can show superior shrinkage force, excellent modulus, and high dimensional stability according to the same, and is preferably applicable to the cap ply cord of the tire and the like.

Particularly, the drawn fiber passes through the process of heat-treating the same at the temperature of about 200° C. or more, for example at the temperature of 230° C., for curing of the adhesive in which the drawn fiber is dipped, in the process of preparing the tire cord by using the drawn PET fiber. Therefore, the properties of the drawn PET fiber after the heat-treatment at 230° C. is directly related with the properties of the tire cord prepared from the same, the drawn PET fiber according to one embodiment of the invention has very developed crystalline structure and oriented structure, as it has high crystallinity, low AOF, and the like even after the heat-treatment at such high temperature, and thus the tire cord prepared therefrom also can show excellent properties. Therefore, the drawn PET fiber according to one embodiment of the invention shows excellent modulus in addition to the superior shrinkage force, and makes it possible to provide a tire cord that can preferably be used to the cap ply cord.

It is preferable that the drawn PET fiber according to one embodiment of the invention has the (010) interplanar spacing (or d-spacing) of the crystal of 58 to 65 Å, the (110) interplanar spacing of 46 to 54 Å, and the (100) interplanar spacing of 44 to 52 Å, wherein the interplanar spacing is calculated from X-ray diffraction (XRD) peak after heat-treating the same at 230° C. for 1 minute. By this, the drawn PET fiber can have very developed crystalline structure, and thus the drawn PET fiber and the tire cord prepared therefrom show higher shrinkage force and modulus, and are preferably applicable to the use of the cap ply cord.

Meanwhile, it is revealed that the drawn PET fiber having different characteristics, in addition to the drawn PET fiber according to one embodiment of the invention described above, can provide the tire cord having superior properties, for example, superior dimensional stability, and such tire cord also can preferably be used to the cap ply cord and the like.

According to another embodiment of the invention, a drawn PET fiber including 90 mol % or more of PET, and showing the elongation of 5.0 to 7.0% when giving the load of 2.0 kg/1000 d, and the elongation of 11.0 to 14.0% when giving the load of 4.5 kg/1000 d, after heat-treating the same at 180° C. for 2 minute under the initial load of 20 g/1000 d is provided.

The drawn PET fiber according to another embodiment of the invention is not largely deformed in length even though the load of 2.0 kg/1000 d or 4.5 kg/1000 d (the loads of 2.0 kg/1000 d and 4.5 kg/1000 d may correspond to the conditions of slow speed driving and high speed driving of the tire, respectively) is given to the fiber at the high temperature of 180° C. corresponding to the condition of high speed driving of the tire, and the difference of the length deformations when each load is given to the fiber is also not large. Therefore, the external dimension of the tire cord is hardly deformed even though the driving speed of the car is suddenly increased and the temperature or the load given to the tire cord is rapidly increased, when the tire cord is prepared by using the drawn PET fiber, because the drawn PET fiber has excellent modulus and dimensional stability. Therefore, it is possible to provide the tire cord having superior dimensional stability that is hardly deformed and hardly deforms the tire according to this even though the driving speed of the car is suddenly increased, by using the drawn PET fiber. Therefore, the tire cord can preferably be used to the cap ply cord and the like, and the controllability and the riding comport of the car, in addition to the high speed driving performance, can more be improved by using the same.

The drawn PET fiber according to another embodiment of the invention may show the elongation of 2.0 to 2.6% when giving the load of 2.0 kg/1000 d, and the elongation of 5.0 to 7.0% when giving the load of 4.5 kg/1000 d, before the heat-treatment.

The drawn PET fiber is not largely deformed in length when the load of 2.0 kg/1000 d is given to the same even at low temperature corresponding to the condition of stop or low speed driving of the tire, and the difference of the length deformations according to the change of the temperature is also not large in comparison with the elongations at high temperature described above. Furthermore, the difference of the length deformations according to the change of the temperature is not large even when the load of 4.5 kg/1000 d is given, in comparison with the elongation at the high temperature described above. Thus, the drawn PET fiber can show superior modulus and dimensional stability, and the external dimension of the tire cord is hardly deformed even when the temperature or the load given to the tire cord is rapidly increased, when the tire cord is prepared by using the drawn PET fiber. Accordingly, it is possible to provide the tire cord having superior dimensional stability that is hardly deformed and hardly deforms the tire including the same even when the driving speed of the car is suddenly increased, by using the drawn PET fiber. Therefore, the tire cord can preferably be used to the cap ply cord and the like, and the controllability and the riding comport of the car, in addition to the high speed driving performance, can more be improved by using the same.

In addition, the drawn PET fiber according to one embodiment or another embodiment of the invention described above may be prepared by the method of melt-spinning the PET so as to prepare an undrawn fiber and drawing the undrawn fiber, and the drawn PET fiber having the properties mentioned above can be prepared under the specific conditions or the specific proceeding methods of each step those are directly or indirectly reflected to the properties of the drawn PET fiber.

Particularly, it is revealed that the drawn PET fiber according to one embodiment or another embodiment of the invention described above can be prepared by obtaining the undrawn PET fiber having the crystallinity of 25% or more, and the AOF of 0.15 or less by controlling the conditions of melt-spinning the PET, and drawing the same.

The undrawn PET fiber used in the preparing process is prepared under the controlled melt-spinning condition explained below, and has the crystallinity of 25% or more, and preferably of 25 to 40%, that is higher than that of formerly known undrawn PET fibers.

At the same time, the undrawn PET fiber shows the AOF of 0.15 or less, and preferably of 0.08 to 0.15, which is largely lower than that of formerly known undrawn PET fibers.

The undrawn PET fiber having such high crystallinity and low AOF shows developed crystalline structure and includes more cross-linking bonds per a unit volume, at the same time, because the molecular chains in the amorphous region slip during the spinning process and form a fine network structure. Thus, the undrawn PET fiber has developed crystalline structure, and the chains in the amorphous region are highly entangled and show a taut structure due to many cross-linking bonds, at the same time. Therefore, the drawn PET fiber and the tire cord prepared from the undrawn PET fiber can show high shrinkage force and modulus, and low shrinkage rate at the same time. Particularly, the drawn PET fiber according to one embodiment or another embodiment of the invention showing the properties described above (for example, high crystallinity and low AOF after the heat-treatment, low elongation and difference of the elongations before or after the heat-treatment, and the like) can be prepared by using the undrawn PET fiber.

Hereinafter, the preparing method of the drawn PET fiber is explained step-by-step more in detail, as follows.

In the preparing method of the drawn PET fiber, firstly, the undrawn PET fiber having high crystallinity and low AOF described above is prepared by melt-spinning the PET.

At this time, the melt-spinning process may be carried out with a higher spinning stress in order to obtain the undrawn PET fiber satisfying such crystallinity and AOF. For example, the melt-spinning process may be carried out with the spinning stress of 0.85 g/d or more, and preferably 0.85 to 1.2 g/d. Also, for example, the melt-spinning speed of the PET may be controlled to be 3800 to 5000 m/min, and preferably 4000 to 4500 m/min in order to obtain such high spinning stress.

As results of experiments, it is revealed that according as the melt-spinning process of the PET is carried out with the high spinning stress and selectively high spinning speed, the oriented crystallization phenomenon occurs and the crystallinity of the PET increases. As a result, the undrawn PET fiber satisfying the crystallinity and the AOF described above can be obtained as the molecular chains constituting the PET slip during the spinning process and form a fine network structure. However, it is realistically not easy to control the spinning speed to be over 5000 m/min and it is also difficult to carry out the cooling process because of the excessive spinning speed.

Furthermore, the chips having an intrinsic viscosity of 0.8 to 1.3 dl/g and including 90 mol % or more of PET may be used in the melt-spinning as the PET in the preparing process of the undrawn PET fiber.

It is preferable that the intrinsic viscosity is 0.8 dl/g or more in order to carry out the spinning step suitably with the conditions of higher spinning speed and spinning stress in the preparing process of the undrawn PET fiber. Also, it is preferable that the intrinsic viscosity is 1.3 dl/g or less in order to prevent the scission of the molecular chains due to the increase of the melting temperature of the chips and the increase of the pressure due to the extrusion amount in the spinning pack.

Furthermore, it is preferable that the chips are spun through the spinnerets designed for making linear density of a monofilament to be 2.0 to 4.0 denier, and preferably 2.5 to 3.0 denier. It is preferable that the linear density of the monofilament is 2.0 denier or more in order to lessen the possibility of the fiber scission during the spinning and the fiber scission due to the interference of the fibers during the cooling, and it is also preferable that the linear density of the monofilament is 4.0 denier or less in order to give the sufficient spinning stress by raising the spinning draft.

Further, the undrawn PET fiber may be prepared by adding the cooling process after the melt-spinning of the PET. Such cooling process may be preferably carried out according to the method of providing a cooling air of 15 to 60° C., and the cooling air flow may be preferably controlled to be 0.4 to 1.5 m/s in each temperature condition of the cooling air. With this, it is possible to prepare the undrawn PET fiber having the crystallinity and the AOF as described above more easily.

On the other hand, the drawn fiber is prepared by drawing the undrawn fiber after preparing the undrawn PET fiber satisfying the crystallinity and the AOF described above through the spinning step. At this time, the drawing process may be carried out under the condition of a drawing ratio of 0.1 to 1.55. In the undrawn PET, the crystalline region is developed, and the chains of the amorphous region also have low degree of orientation and form the fine network. Therefore, the scission of the fibers or hairiness may occur in the drawn fiber when the drawing process is carried out with the drawing ratio of over 1.55, and thus the drawn PET fiber prepared by the method is also hard to show the preferable properties. Furthermore, the strength of the drawn PET fiber and the tire cord prepared therefrom may be partially lowered when the drawing process is carried out with a relatively low drawing ratio. However, it is possible to prepare the PET tire cord having the strength of 6 g/d or more, which is suitable to be applied for the cap ply cord and the like, under the drawing ratio of 1.0 or more, and thus the drawing process may preferably be carried out with the drawing ratio of 1.0 to 1.55.

Furthermore, the undrawn fiber may be heat-treated at the temperature of about 160 to 240° C. in the drawing process, and preferably at the temperature of 200° C. or less for adequate progress of the drawing process.

The drawn PET fiber prepared by the method described above can show various properties according to one embodiment or another embodiment of the invention, for example, the properties of high crystallinity and low AOF after the heat-treatment, low elongation and difference of the elongations before or after the heat-treatment, and the like.

In addition, the PET tire cord including the drawn PET fiber described above is provided according to sill another embodiment of the invention.

The PET tire cord may show the elongation of 0.5 to 2.0% when giving the load of 2.0 kg/2000 d, and the elongation of 3.0-6.0% when giving the load of 4.5 kg/2000 d, after heat-treating the same at 180° C. for 2 minute under the initial load of 0.01 g/d.

Such PET tire cord is not largely deformed in length even the load of 2.0 kg/2000 d or 4.5 kg/2000 d is given to the same at the high temperature of 180° C. corresponding to the condition of high speed driving of the tire, and the difference of the length deformations when each load is given to the cord is also not large. Thus, the PET tire cord has excellent modulus and dimensional stability, and thus the external dimension of the tire cord is hardly deformed even though the driving speed of the car is suddenly increased and the temperature or the load given to the tire cord is rapidly increased. Therefore, the tire cord can preferably be used to the cap ply cord and the like, and the controllability and the riding comport of the car, in addition to the high speed driving performance, can more be improved, because the deformation of the tire due to the deformation of the tire cord can be inhibited by using the same even though the driving speed of the car is suddenly increased.

Furthermore, the PET tire cord may show the elongation of 0.3 to 1.7%, and preferably of 0.7 to 1.7%, when giving the load of 2.0 kg/2000 d, and the elongation of 2.0 to 4.0% when giving the load of 4.5 kg/2000 d, before the heat-treatment.

The PET tire cord is not largely deformed in length when the load of 2.0 kg/2000 d or 4.5 kg/2000 d is given to the same even at low temperature corresponding to the condition of stop or low speed driving of the tire, and not only the difference of the length deformations when each load is given to the fiber is not large but also the difference of the length deformations according to the change of the temperature is not large in comparison with the elongations at high temperature described above. Thus, the external dimension of the tire cord is hardly deformed even though the temperature or the load given to the tire cord is rapidly increased. Therefore, the high speed driving performance or the controllability and the riding comport of the car can more be improved, because the deformations of the tire cord itself and the tire including the same can be minimized even when the driving speed of the car is suddenly increased.

Furthermore, it is preferable in view of the dimensional stability that the PET tire cord according to still another embodiment of the invention has the L/S value defined as the following Calculation Formula 1 of 70 g/d to 150 g/d:

$$L/S = LASE/\text{Shrinkage rate (\%)} \qquad \text{[Calculation Formula 1]}$$

In the calculation formula, LASE is a value defined as Load At Specific Elongation, and it is particularly defined as the load when the elongation is 3% at 100° C. in the calculation formula above. It is due to that the initial modulus has relatively large importance in the case of the PET tire cord.

In order to satisfy such L/S value, the LASE of the PET tire cord defined as the load at 3% elongation may be 1.7 to 3.0 g/d when testing the tensile property with the initial load of 0.05 g/d at the temperature of 100° C.

The L/S value in the Calculation Formula 1 represents how the tire cord maintains its dimension stably against external heat or force as a dimensional stability index. Namely, the tire cord is hardly deformed by the external heat or force and can maintain its dimension stably, as the L/S value is high. The PET tire cord according to still another embodiment has very high L/S value, for example, L/S value of 70 g/d to 150 g/d, because it is prepared from the drawn fiber having high shrinkage force and modulus described above. Thus, the PET tire cord is hardly deformed by the external heat or force and can effectively restrain the movement of the steel belt by wrapping the steel belt in the tire. Furthermore, the PET tire cord can effectively inhibit the partial deformation due to the load of the tire and the car, and the noise due to the deformation.

On the other hand, the shape of the PET tire cord according to still another embodiment of the invention described above is not specifically limited, and thus the shape may be equal to conventional cap ply cords. More particularly, such PET tire cord may have a shape of a dipped cord, of which the total linear density per a cord is 1000 to 5000 denier, the number of ply is 1 to 3, and the twisting level is 200 to 500 TPM (twist per meter), according to the shape of conventional cap ply cord.

Furthermore, the PET tire cord may show the strength of 5 to 8 g/d, the elongation (Elongation at the load of 4.5 kgf) of 1.5 to 5.0%, and preferably of 2.0 to 5.0%, the elongation at break of 10 to 25%, and the shrinkage rate (177° C., 30 g, 2 min) of 0.5 to 5.0%, and preferably of 2.0 to 5.0%. The tire cord is preferably applicable to the cap ply cord, according as it shows the properties, such as the strength, the elongation, and the like, of the above range.

Furthermore, the PET tire cord is applicable to the pneumatic tire as the cap ply cord. The cap ply cord has superior dimensional stability and its external shape is hardly deformed, and thus the tire in which the PET tire cord is included is also not deformed easily. Therefore, the tire can improve the controllability or the riding comport of the car. Furthermore, the tire in which the cap ply cord is included can show stable high speed driving performance because the PET tire cord has several properties able to restrain the movement of the steel belt and suitable for the cap ply cord.

Simply, the PET tire cord according to still another embodiment of the invention described above is mainly explained by supposing that the cord is used as the cap ply cord, however, the use of the PET tire cord is not limited to this and it is of course that the cord may be used for the other uses such as a body ply cord and the like.

On the other hand, the tire cord according to still another embodiment of the invention may be prepared by the method of melt-spinning the PET so as to prepare the undrawn PET fiber, drawing the undrawn PET fiber so as to prepare the drawn PET fiber, and twisting the drawn PET fibers and dipping the same in an adhesive. The tire cord prepared like this may be a dip cord type. In the preparation process, the specific conditions or the specific proceeding methods of each step may directly or indirectly be reflected to the properties of the tire cord prepared finally, and the PET tire cord having above mentioned properties can be prepared.

For example, it is revealed that the tire cord according to still another embodiment of the invention having above mentioned properties can be provided by melt-spinning the PET with the condition of higher spinning stress and selectively high spinning speed so as to prepare the undrawn PET fiber having crystallinity of 25% or more and the AOF of 0.15 or less, and preparing the drawn PET fiber and the tire cord by using the same. For example, the PET tire cord according to still another embodiment of the invention may be prepared by using the drawn PET fiber according to one embodiment or another embodiment of the invention.

That is, the drawn PET fiber showing low shrinkage rate and high modulus together in addition to high shrinkage force can be prepared because of the high crystallinity and the low AOF of the undrawn PET fiber, and thus the PET tire cord according to still another embodiment of the invention of which the elongations themselves are not large when giving low load or high load at low temperature or high temperature and the difference of the elongations is also not large can be prepared by using the same.

The PET tire cord according to still another embodiment of the invention may be prepared by using the drawn PET fiber, after preparing the undrawn PET fiber showing high crystallinity and low AOF and preparing the drawn PET fiber according to one embodiment or another embodiment of the invention from the undrawn fiber. At this time, the PET tire cord is prepared into a dip cord type by twisting the drawn PET fiber, and dipping the same into an adhesive, and the twisting process and the dipping process follow conventional process conditions and methods of preparing a PET tire cord.

BRIEF DESCRIPTION OF THE DRAWINGS

FIG. 1 is a partial cut-away perspective view illustrating a structure of a general tire.

EXAMPLES

Hereinafter, the technical features and the operations of the invention are described in further detail through preferable examples. However, the following examples are only for the understanding of the invention and the scope of the invention is not limited to or by them.

Examples 1 to 9

Preparation of Undrawn PET Fibers

The undrawn PET fibers of Examples 1 to 9 were prepared by the method of melt-spinning the PET polymer having specific intrinsic viscosity (dl/g), and cooling the same. At this time, the intrinsic viscosity of the PET polymer and the conditions of spinning speed and spinning stress of the melt-spinning process were as disclosed in the following Table 1, and the other conditions followed conventional conditions for preparing an undrawn PET fiber.

TABLE 1

| | Examples | | | | | | | | |
|---|---|---|---|---|---|---|---|---|---|
| | 1 | 2 | 3 | 4 | 5 | 6 | 7 | 8 | 9 |
| Intrinsic Viscosity (dl/g) | 0.85 | 1.05 | 1.05 | 1.05 | 1.05 | 1.20 | 0.9 | 1.2 | 1.05 |
| Spinning Speed (m/min) | 4200 | 3800 | 4000 | 4200 | 4500 | 4200 | 4500 | 4500 | 4800 |
| Spinning stress (g/d) | 0.93 | 0.86 | 0.92 | 1.03 | 1.15 | 1.08 | 0.98 | 1.23 | 1.19 |

Comparative Examples 1 to 7

Preparation of Undrawn PET Fibers

The undrawn PET fibers of Comparative Examples 1 to 7 were prepared substantially according to the same method as in Examples 1 to 9, except the conditions disclosed in the following Table 2.

TABLE 2

| | Comparative Examples | | | | | | |
|---|---|---|---|---|---|---|---|
| | 1 | 2 | 3 | 4 | 5 | 6 | 7 |
| Intrinsic Viscosity (dl/g) | 0.75 | 1.05 | 1.05 | 1.05 | 1.05 | 1.30 | 1.05 |
| Spinning Speed (m/min) | 4200 | 3000 | 3500 | 3800 | 5000 | 4200 | 3000 |
| Spinning stress (g/d) | 0.81 | 0.52 | 0.63 | 0.72 | Unable to spin | Unable to spin | 0.6 |

The crystallinity and the AOF of the undrawn fibers prepared according to Examples 1 to 9 and Comparative Examples 1 to 7 were measured by the following methods, and the measured results are listed in the following Tables 3 and 4 (wherein, the properties of the undrawn fibers of Comparative Examples 5 and 6 those are unable to spin are excluded among the Comparative Examples).

Crystallinity: the density was measured after preparing a density gradient tube by using $CCl_4$ and n-heptane, and the crystallinity was calculated from the density by using the following calculation formula:

$$PET\ Crystallinity(\%) = Xc(\%) = \left(\frac{\rho - \rho_a}{\rho_c - \rho_a}\right) \times 100$$

wherein, $\rho_a$=1.336, and $\rho_c$=1.457 in case of the PET.

Amorphous orientation factor (AOF): the AOF was calculated according to the following formula by using the birefringence index that is measured by using a polarization microscope and the crystal orientation factor (COF) that is measured by X-ray diffraction (XRD):

AOF=(birefringence index−crystallinity (%)*0.01*COF*0.275)/((1−crystallinity (%)*0.01)*0.22).

TABLE 3

| | Examples | | | | | | | | |
|---|---|---|---|---|---|---|---|---|---|
| | 1 | 2 | 3 | 4 | 5 | 6 | 7 | 8 | 9 |
| Crystallinity (%) | 32 | 28 | 30 | 33 | 36 | 33 | 34 | 36 | 38 |
| AOF | 0.074 | 0.120 | 0.093 | 0.054 | 0.009 | 0.061 | 0.015 | 0.012 | 0.002 |

TABLES 4

| | Comparative Examples | | | | |
|---|---|---|---|---|---|
| | 1 | 2 | 3 | 4 | 7 |
| Crystallinity (%) | 24 | 9 | 12 | 22 | 9 |
| AOF | 0.157 | 0.245 | 0.255 | 0.168 | 0.218 |

Referring to Tables 3 and 4, it is recognized that the undrawn fibers of Examples 1 to 9 prepared under high spinning stress and spinning speed have high crystallinity and low AOF, and show developed crystalline structure and superior orientation characteristics, on the contrary, the undrawn fibers of Comparative Examples 1 to 4, and 7 do not satisfy such properties.

Examples 10 to 15

Preparation of Drawn PET Fibers

The drawn PET fibers of Examples 10 to 15 were prepared by drawing the undrawn fibers prepared in Examples 1 to 6 with the drawing ratio as disclosed in Table 5, and heat-treating the same at 180° C.

Comparative Examples 8 to 11

Preparation of Drawn PET Fibers

The drawn PET fibers of Comparative Examples 8 to 11 were prepared substantially according to the same method as in Examples 10 to 15, except that the undrawn fibers prepared according to Comparative Examples 1 to 4 were used and the drawing ratios as disclosed in the following Table 6 were applied.

The properties of the drawn PET fibers of Examples 10 to 15 and Comparative Examples 8 to 11 were measured by the following methods, after heat-treating the same in a fixed state under the initial load of 20 g/1000 d at 230° C. for about 1 minute, and the results are listed in Tables 5 and 6, respectively.

- Crystallinity and AOF: the crystallinity and the AOF of the drawn PET fiber were measured and calculated by the same method as in the undrawn PET fibers.
- Birefringence index: the birefringence index was measured by using a polarization microscope.
- Dry heat shrinkage rate: the dry heat shrinkage rate was measured at the temperature of 180° C. and the initial load of 30 g for 2 minutes by using Testrite MK-V device of Testrite Co., England.
- Strength, Strength at 1% elongation, LASE value, and Elongation at the load of 4.5 kgf: the strength, the strength at 1% elongation, the LASE value, and the Elongation at the load of 4.5 kgf were measured by using a universal testing machine, according to the testing method of ASTM D885.
- Melting temperature and Specific heat of crystal (ΔH): the fibers (the drawn fibers) were cut fine to be about 2 mg of samples, and the melting temperature and the specific heat of crystal were measured by using a DSC-7 device. At this time, the heating rate was 20° C./min.
- Interplanar spacing: the interplanar spacing was measured by using the XRD method.

TABLE 5

|  | Examples | | | | | |
| --- | --- | --- | --- | --- | --- | --- |
|  | 10 | 11 | 12 | 13 | 14 | 15 |
| Undrawn Fibers | Example 1 | Example 2 | Example 3 | Example 4 | Example 5 | Example 6 |
| Drawing Ratio | 1.39 | 1.54 | 1.46 | 1.39 | 1.30 | 1.39 |
| Crystallinity (%) | 55 | 53 | 54 | 55 | 56 | 54 |
| Birefringence Index | 0.145 | 0.153 | 0.149 | 0.144 | 0.143 | 0.144 |
| AOF | 0.06 | 0.15 | 0.12 | 0.05 | 0.02 | 0.05 |
| Strength (g/d) | 6.0 | 7.0 | 6.7 | 6.3 | 6.0 | 6.4 |
| Dry Heat Shrinkage Rate (%) | 6.5 | 8.3 | 8.0 | 6.3 | 5.8 | 7.4 |
| Strength at 1% Elongation (g/d) | 0.92 | 0.82 | 0.90 | 0.98 | 1.03 | 0.93 |
| Elongation at the load of 4.5 kgf (%) | 5.3 | 5.0 | 5.2 | 5.5 | 5.7 | 5.4 |
| 010 Interplanar Spacing (Å) | 60 | 58 | 60 | 60 | 61 | 59 |
| 110 Interplanar Spacing (Å) | 49 | 46 | 48 | 49 | 50 | 48 |
| 100 Interplanar Spacing (Å) | 47 | 44 | 46 | 48 | 50 | 46 |

TABLE 6

|  | Comparative Examples | | | |
| --- | --- | --- | --- | --- |
|  | 8 | 9 | 10 | 11 |
| Undrawn Fibers | Comparative Example 1 | Comparative Example 2 | Comparative Example 3 | Comparative Example 4 |
| Drawing Ratio | 1.39 | 1.8 | 1.57 | 1.50 |
| Crystallinity (%) | 52 | 49 | 50 | 51 |
| Birefringence Index | 0.175 | 0.189 | 0.184 | 0.179 |
| AOF | 0.38 | 0.54 | 0.50 | 0.43 |
| Strength (g/d) | 5.4 | 7.8 | 7.6 | 7.2 |
| Dry Heat Shrinkage Rate (%) | 9.2 | 12.5 | 11.7 | 10.2 |
| Strength at 1% Elongation (g/d) | 0.545 | 0.442 | 0.473 | 0.523 |
| Elongation at the load of 4.5 kgf (%) | 7.4 | 5.4 | 5.5 | 5.9 |
| 010 Interplanar Spacing (Å) | 55 | 54 | 54 | 55 |
| 110 Interplanar Spacing (Å) | 42 | 43 | 42 | 42 |
| 100 Interplanar Spacing (Å) | 45 | 40 | 41 | 44 |

As shown in Tables 5 and 6, it is recognized that the drawn fibers of Examples 10 to 15 prepared from the undrawn fibers of Examples 1 to 6 have high crystallinity and birefringence index, low AOF, low dry heat shrinkage rate, and high strength at 1% elongation, after heat-treating the same under a specific condition. On the contrary, it is also recognized that the drawn PET fibers of Comparative Examples 8 to 11 prepared from the undrawn fibers of Comparative Examples 1 to 4 do not satisfy such properties.

Examples 16 to 21

Preparation of Tire Cords

The dip cords for cap ply were prepared by Z-twisting (counter-clockwise twisting) the drawn PET fibers prepared in Examples 10 to 15 with the twisting level of 430 TPM, S-twisting (clockwise twisting) the Z-twisted fibers with the twisting level of 430 TPM, dipping the same into an resorcinol/formaldehyde/latex (RFL) adhesive solution, and drying and heat-treating the same so as to prepare the tire cords. At this time, the drawn fibers of 1000 denier were twisted with the twisting level of 430 TPM.

Comparative Examples 12 to 15

Preparation of Tire Cords

The dip cords for cap ply were prepared by Z-twisting the drawn PET fibers prepared in Comparative Examples 8 to 11 with the twisting level of 430 TPM, S-twisting the Z-twisted fibers with the twisting level of 430 TPM, dipping the same into the RFL adhesive solution, and drying and heat-treating the same so as to prepare the tire cords.

The L/S values, and the LASE values at 3% elongation measured at 100° C. with the initial load of 0.05 g/d of the tire cords prepared in Examples 16 to 21 and Comparative Examples 12 to 15 are listed in the following Table 7.

TABLE 7

| | Drawn Fibers used | L/S (g/d) | LASE at 3% Elongation (g/d) |
|---|---|---|---|
| Example 16 | Example 10 | 84 | 1.80 |
| Example 17 | Example 11 | 71 | 1.95 |
| Example 18 | Example 12 | 70 | 1.90 |
| Example 19 | Example 13 | 81 | 1.85 |
| Example 20 | Example 14 | 94 | 2.10 |
| Example 21 | Example 15 | 73 | 1.90 |
| Comparative Example 12 | Comparative Example 8 | 68 | 1.60 |
| Comparative Example 13 | Comparative Example 9 | 55 | 1.30 |
| Comparative Example 14 | Comparative Example 10 | 64 | 1.45 |
| Comparative Example 15 | Comparative Example 11 | 67 | 1.50 |

As shown in Table 7, it is recognized that the tire cords of Examples 16 to 21 those are prepared from the drawn fibers having high crystallinity and the like after the heat-treatment have the L/S values in the range of 70 to 150 g/d, and they have the LASE values in the range of 1.7 to 3.0 g/d even at 100° C. that is similar to the real operating circumstance of the tire, and thus they show superior dimensional stability and are preferable to be used as the cap ply tire cord. On the contrary, it is also recognized that the tire cords of Comparative Examples 12 to 15 do not satisfy such characteristics.

Comparative Example 16

Preparation of Drawn PET Fiber

The drawn PET fiber of Comparative Example 16 was prepared substantially according to the same method as in Examples 10 to 15, except that the undrawn fiber prepared according to Comparative Example 7 was used and the drawing ratio or 2.8 was applied.

Comparative Example 17

Preparation of the Drawn Fiber by Using a Nylon 66 Fiber

The undrawn fiber was prepared by melt-spinning the nylon 66 polymer of which the relative viscosity was 3.3 with the spinning speed of 600 m/min, and cooling the same, and then the drawn fiber was prepared by drawing the undrawn fiber with the drawing ratio of 5.5, and heat-setting and winding the same.

The elongations by temperatures and loads were measured with regard to the drawn fibers prepared according to Examples 11 to 15, and Comparative Examples 16 and 17 by using the universal testing machine on the basis of the method of ASTM D885. More particularly, the elongations when giving the loads of 2.0 kg/1000 d and 4.5 kg/1000 d to the drawn fiber at a room temperature were measured at first, and the elongations when giving the loads of 2.0 kg/1000 d and 4.5 kg/1000 d to the drawn fiber after heat-treating the same at 180° C. for 2 minute under the initial load of 20 g/1000 d were measured, respectively.

The elongations by temperatures and loads of the drawn fibers measured like above are listed in the following Tables 8 and 9.

TABLE 8

| Temperature and Load | | Example 11 (Elongation; %) | Example 12 (Elongation; %) | Example 13 (Elongation; %) | Example 14 (Elongation; %) | Example 15 (Elongation; %) |
|---|---|---|---|---|---|---|
| Before Heat-treating (Room Temperature) | 2.0 kg/1000 d | 2.5 | 2.4 | 2.3 | 2.1 | 2.3 |
| | 4.5 kg/1000 d | 6.2 | 6.1 | 6.0 | 5.8 | 6.1 |
| After Heat-treating (180° C., 2 minutes) | 2.0 kg/1000 d | 6.6 | 6.3 | 5.8 | 5.6 | 6.0 |
| | 4.5 kg/1000 d | 13.0 | 12.7 | 12.4 | 11.9 | 12.7 |

TABLE 9

| Temperature and Load | | Comparative Example 16 (Elongation; %) | Comparative Example 17 (Elongation; %) |
|---|---|---|---|
| Before Heat-treating (Room Temperature) | 2.0 kg/1000 d | 2.8 | 6.8 |
| | 4.5 kg/1000 d | 6.2 | 10.9 |
| After Heat-treating (180° C., 2 minutes) | 2.0 kg/1000 d | 9.0 | 9.9 |
| | 4.5 kg/1000 d | 16.4 | 17.1 |

Referring to Tables 8 and 9, it is recognized that the drawn PET fiber according to Examples 11 to 15 prepared from the undrawn PET fiber showing high crystallinity and low AOF shows not only lower elongations themselves by temperatures and loads than that of the drawn fibers of Comparative Examples 16 and 17 but also lower difference between the elongations by temperatures and loads than that of the drawn fibers of Comparative Examples 16.

From this, it is recognized that the drawn PET fiber according to Examples 11 to 15 is hardly deformed even though the temperature and the load given to the same is rapidly increased.

Therefore, it is recognized that it is possible to provide the tire cord having superior dimensional stability that is hardly deformed and hardly deforms the tire including the same even though the driving speed of the car is suddenly increased because the drawn PET fiber according to Examples 11 to 15 has superior dimensional stability.

Examples 22 to 24

Preparation of Drawn PET Fibers and Tire Cords

The drawn PET fibers of Examples 22 to 24 were prepared substantially according to the same method as in Examples 10 to 15, except that the undrawn fibers prepared according to Examples 7 to 9 were drawn with the drawing ratio of 1.24, 1.24, and 1.16, respectively.

And then, the dip cords for cap ply were prepared by Z-twisting (counter-clockwise twisting) the drawn PET fibers of Examples 22 to 24 with the twisting level of 430 TPM, S-twisting (clockwise twisting) the Z-twisted fibers with the twisting level of 430 TPM, dipping the same into an resorcinol/formaldehyde/latex (RFL) adhesive solution, and drying and heat-treating the same so as to prepare the tire cords. At this time, the drawn fibers of 1000 denier were twisted with the twisting level of 430 TPM.

Example 25

Preparation of a Tire Cord

The tire cord was prepared by using the drawn PET fiber of Example 14 obtained from the undrawn fiber of Example 5.

At this time, the dip cord for cap ply was prepared substantially according to the same method as in Examples 22 to 24, except that the drawn fibers of total linear density of 1000 denier (d) were Z-twisted with the twisting level of 260 TPM, and then 2 plies of the Z-twisted fibers were S-twisted with the same twisting level.

Comparative Example 18

Preparation of a Tire Cord by Using the Nylon 66 Fiber

The dip cord for cap ply was prepared by Z-twisting the drawn fibers of Comparative Example 17 having total linear density of 840 denier with the twisting level of 310 TPM, S-twisting 2 plies of the Z-twisted fibers with the same twisting level, passing the same through the RFL adhesive solution, and drying and heat-treating the same.

The elongations by temperatures and loads were measured with regard to the tire cords according to Examples 17, 18, 20, and 22 to 25, and Comparative Examples 13 and 18 by using the universal testing machine on the basis of the method of ASTM D885. More particularly, the elongations when giving the loads of 2.0 kg/2000 d and 4.5 kg/2000 d to the tire cord at a room temperature were measured at first, and the elongations when giving the loads of 2.0 kg/2000 d and 4.5 kg/2000 d to the tire cord after heat-treating the same at 180° C. for 2 minute in the state of giving the initial load of 0.01 g/d to the cord were measured, respectively.

The elongations by temperatures and loads of each cord measured like above are listed in the following Tables 10 and 11.

TABLE 10

| Temperature and Load | | Example 17 Elongation; %) | Example 18 (Elongation; %) | Example 20 (Elongation; %) | Example 22 (Elongation; %) | Example 23 (Elongation; %) |
|---|---|---|---|---|---|---|
| Before Heat-treating (Room Temperature) | 2.0 kg/2000 d | 1.0 | 1.0 | 1.2 | 1.2 | 1.1 |
| | 4.5 kg/2000 d | 3.6 | 3.3 | 2.9 | 3.2 | 2.9 |
| After Heat-treating (180° C., 2 minutes) | 2.0 kg/2000 d | 1.5 | 1.4 | 1.4 | 1.4 | 1.54 |
| | 4.5 kg/2000 d | 5.2 | 4.8 | 5.2 | 5.4 | 4.6 |

TABLE 11

| Temperature and Load | | Example 24 (Elongation; %) | Example 25 (Elongation; %) | Comparative Example 13 (Elongation; %) | Comparative Example 18 (Elongation; %) |
|---|---|---|---|---|---|
| Before Heat-treating (Room Temperature) | 2.0 kg/2000 d | 1.2 | 0.9 | 1.4 | 4.2 |
| | 4.5 kg/2000 d | 2.8 | 2.4 | 4.6 | 8.1 |
| After Heat-treating (180° C., 2 minutes) | 2.0 kg/2000 d | 1.3 | 1.1 | 2.0 | 6.2 |
| | 4.5 kg/2000 d | 4.6 | 4.6 | 7.3 | 10.8 |

Referring to Tables 10 and 11, it is recognized that the tire cords of Examples prepared from the undrawn PET fibers showing high crystallinity and low AOF show not only lower elongations themselves by temperatures and loads than that of the tire cords of Comparative Examples but also lower difference between the elongations by temperatures and loads than that of the tire cords of Comparative Examples.

From this, it is recognized that the tire cords of Examples are hardly deformed even though the temperature and the load given to the same are rapidly increased. Therefore, it is recognized that the tire cord has superior dimensional stability and is hardly deformed and hardly deforms the tire including the same even though the driving speed of the car is suddenly increased.

What is claimed is:

1. A drawn PET fiber, including 90 mol % or more of PET, and showing the elongation of 5.0 to 7.0% when giving the load of 2.0 kg/1000 d, and the elongation of 11.0 to 14.0% when giving the load of 4.5 kg/1000 d, after heat-treating the same at 180° C. for 2 minute under the initial load of 20 g/1000 d, wherein the drawn PET fiber is obtained by drawing an undrawn PET fiber at a draw ratio of 0.1 to 1.55, and wherein the undrawn PET fiber has an amorphous orientation factor (AOF) of 0.15 or less.

2. The drawn PET fiber according to claim 1, showing the elongation of 2.0 to 2.6% when giving the load of 2.0 kg/1000 d, and the elongation of 5.0 to 7.0% when giving the load of 4.5 kg/1000 d, before the heat-treatment.

3. A PET tire cord, including the drawn fiber according to claim 1.

4. The PET tire cord according to claim 3, wherein the L/S value defined by the following Calculation Formula 1 is 70 g/d to 150 g/d:

$$L/S = LASE/\text{Shrinkage rate (\%)} \quad \text{[Calculation Formula 1]}$$

In the calculation formula, LASE is defined as load at specific elongation when the elongation is 3% at 100° C.

5. The PET tire cord according to claim 4, wherein the LASE defined as the load at 3% elongation is 1.7 to 3.0 g/d when testing the tensile property with the initial load of 0.05 g/d at the temperature of 100° C.

6. The PET tire cord according to claim 4, wherein total linear density is 1000 to 5000 denier, the number of ply is 1 to 3, and the twisting level is 200 to 500 TPM.

7. The PET tire cord according to claim 4, showing the strength of 5 to 8 g/d, the Elongation (@4.5 kgf) of 1.5 to 5.0%, and the elongation at break of 10 to 25%.

8. The PET tire cord according to claim 4, wherein the tire cord is a cord for cap ply.

9. A pneumatic tire, including the tire cord according to claim 3.

* * * * *